(12) United States Patent
Gebhart et al.

(10) Patent No.: US 7,587,480 B2
(45) Date of Patent: Sep. 8, 2009

(54) AUTOMATED GRID COMPUTE NODE CLEANING

(75) Inventors: Alexander Gebhart, Bad Schoenborn (DE); Erol Bozak, Pforzheim (DE)

(73) Assignee: SAP AG, Walldorf (DE)

( * ) Notice: Subject to any disclaimer, the term of this patent is extended or adjusted under 35 U.S.C. 154(b) by 646 days.

(21) Appl. No.: 11/017,401

(22) Filed: Dec. 20, 2004

(65) Prior Publication Data

US 2006/0168352 A1   Jul. 27, 2006

(51) Int. Cl.
*G06F 15/177* (2006.01)
*G06F 11/00* (2006.01)
*G06F 15/173* (2006.01)

(52) U.S. Cl. .................... 709/223; 709/220; 714/42

(58) Field of Classification Search ............. 709/220, 709/223; 714/42
See application file for complete search history.

(56) References Cited

U.S. PATENT DOCUMENTS

| | | | |
|---|---|---|---|
| 6,944,858 B2* | 9/2005 | Luu | 717/174 |
| 7,100,089 B1* | 8/2006 | Phelps | 714/42 |
| 2003/0055919 A1* | 3/2003 | Fong et al. | 709/220 |

* cited by examiner

*Primary Examiner*—Tonia L Dollinger
*Assistant Examiner*—Anish Sikri
(74) *Attorney, Agent, or Firm*—Finnegan, Henderson, Farabow, Garrett & Dunner LLP

(57) ABSTRACT

A method includes, in a network of interconnected grid compute nodes, storing system criteria for a first grid compute node, storing an initial snapshot of the first grid compute node, comparing a current snapshot of the first grid compute node with the initial snapshot to identify parts of the current snapshot that do not meet the criteria, and adjusting the first compute node to meet the criteria.

30 Claims, 2 Drawing Sheets

AUTOMATED GRID COMPUTE NODE CLEANING

TECHNICAL FIELD

The present invention relates to data processing by digital computer, and more particularly to automated grid compute node cleaning.

BACKGROUND

Grid computing is a form of distributed system wherein computing resources are shared across networks. Grid computing enables the selection, aggregation, and sharing of information resources resident in multiple administrative domains and across geographic areas. These information resources are shared, for example, based upon their availability, capability, and cost, as well as a user's quality of service (QoS) requirements. Grid computing can mean reduced cost of ownership, aggregated and improved efficiency of computing, data, and storage resources, and enablement of the creation of virtual organizations for applications and data sharing.

Grid-enabled software applications can be deployed (e.g., installed, customized) to grid compute nodes within a grid network. After usage, the deployed grid-enabled software applications are removed. However, there is always a chance that some parts of the grid-enabled software applications remain on the grid compute nodes after usage. For example, in some cases there is no clean deployed grid-enabled application removal without restarting the grid compute node after usage. Another example is that application developers sometimes forget to remove all parts of the grid-enabled application after usage. With the complete removal of grid-enabled applications this results in grid compute nodes that become slow performers and more unusable over time.

SUMMARY

The present invention provides methods and apparatus, including computer program products, for automated grid compute node cleaning.

In one aspect, the invention features a method including, in a network of interconnected grid compute nodes, storing system criteria for a first grid compute node, storing an initial snapshot of the first grid compute node, comparing a current snapshot of the first grid compute node with the initial snapshoot to identify parts of the current snapshot that do not meet the criteria, and adjusting the first compute node to meet the criteria.

In embodiments, the system criteria can include a listing of all files and directories, a total disk space usage, a list of Transmission Control Protocol/Internet Protocol (TCP/IP) ports, memory usage, processor usage, and/or network usage. The system criteria are customizable.

Adjusting can include rebooting the first grid compute node, and starting a grid container in the first compute node. Adjusting can also include comparing another current snapshot of the first grid compute node with the initial snapshot to identify parts of the current snapshot that do not meet the criteria, and adjusting the first compute node to meet the criteria.

Adjusting can also include installing a new disk image on the first grid computer node. Installing can include placing the new disk image on a bootable local storage medium of the first grid compute node. Installing can include booting the first grid compute node with the new image located on a network device in the grid network.

The system criteria can be weighted. The new image can include the initial snapshoot.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
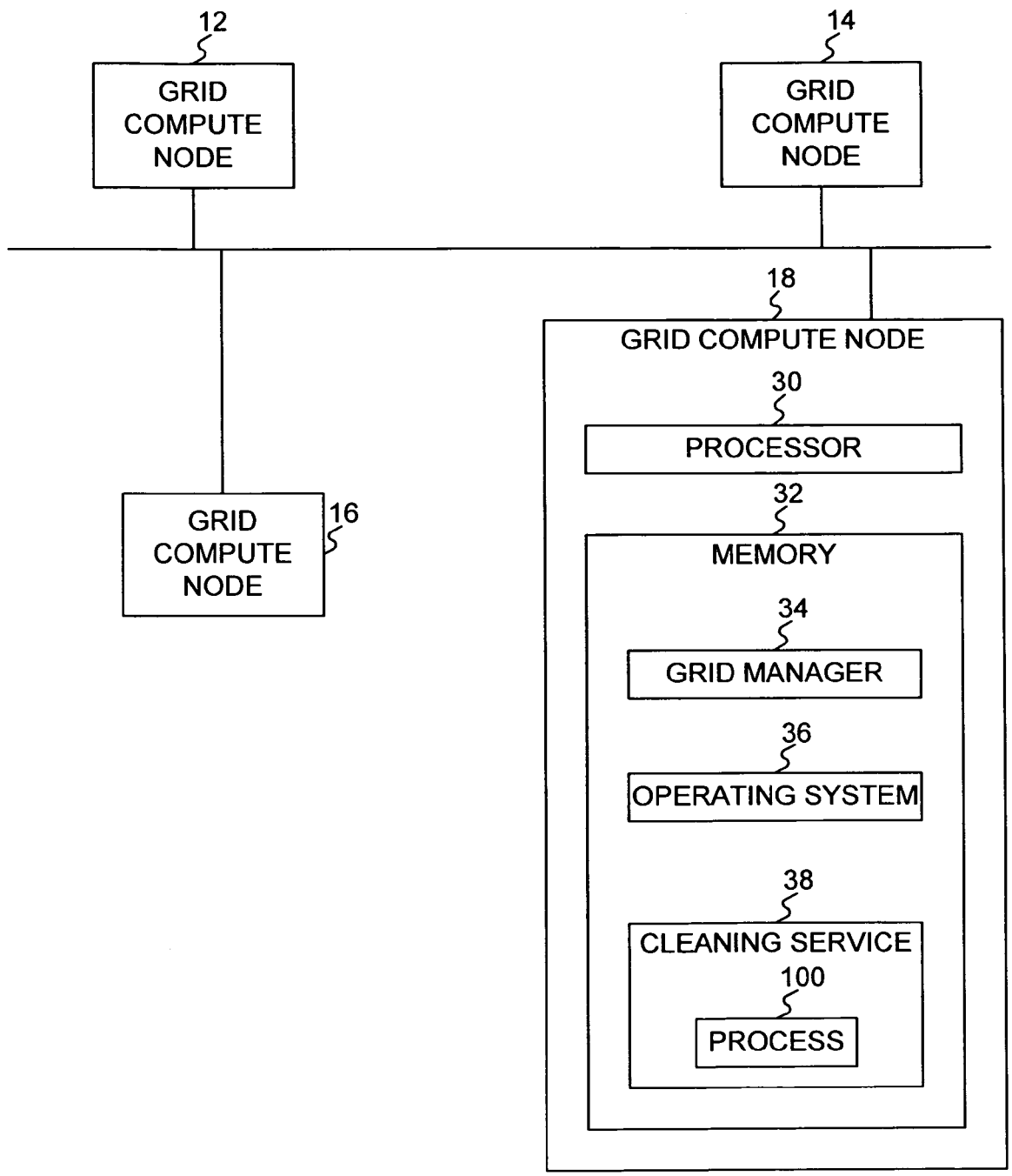
FIG. 1 is block diagram.

As shown in FIG. 1, a grid network 10 in accordance with one embodiment of the invention includes a number of interconnected grid compute nodes 12, 14, 16, 18. In an example, the grid network 10 is implemented as a client-server network. Client/server describes a relationship between two computer programs in which one program, the client, makes a service request from another program, the server, which fulfills the request. Although the client/server idea can be used by programs within a single computer, it is a more important idea in a network, such at network 10. In a network, the client/server model provides a convenient way to interconnect programs that are distributed efficiently across different locations.

In the client/server model, one server, sometimes called a daemon, is activated and awaits client requests. Typically, multiple client programs share the services of a common server program. Both client programs and server programs are often part of a larger program or application. Relative to the Internet, a Web browser is a client program that requests services from a Web server in another computer somewhere on the Internet.

Each of the grid compute nodes, grid compute node 18 for example, can include a processor 30 and a memory 32. Memory 32 includes a grid manager 34, an operating system (OS) 36, such as Unix, Linux or Windows, and grid application cleaning service 38, which executes a grid application cleaning process 100. As grid-enabled software applications are deployed, executed, and terminated, the grid application cleaning process 100 handles removal of grid-enabled applications.

In one particular example, the grid application cleaning process 100 takes an initial snapshot of a target grid compute node in which a grid-enabled application is currently running on at grid startup. In another particular example, the grid application cleaning process 100 takes a snapshot of a target grid compute node in which a grid-enabled application is currently running on at first usage of the grid computer node.

The initial snapshot, which is stored in memory or other storage medium, includes all resources that are managed by the target grid compute node, such as a listing of all files and directories, a total used disk space, a list of all used and free Transmission Control Protocol/Internet Protocol (TCP/IP) ports, memory usage, processor and network usage, and so forth. Once the initial snapshot is in place, the target grid compute node becomes part of the grid network 10 and is used.

After a predetermined period of time that is customizable (e.g., once in a week) and/or if a certain condition is met (e.g., no application is currently deployed and running on the target grid compute node), the grid application cleaning service 38 takes a snapshot of a current state of the target grid compute node and compares it to the snapshot of the initial state of the target grid compute node. When the current snapshot is taken no grid-enabled applications are running on the target grid compute node. To ensure that no grid-enabled applications are running on the target grid compute node, the grid application cleaning process 100 can stop usage of the target grid compute node for a period of time. In a particular example, process 100 notifies a grid manager service residing in the target grid compute node to accept no queries from other grid compute nodes. In another particular example, process 100 waits until no applications are running on the target grid compute node and at that time temporarily blocks further usage of the target grid computer node.

The process 100 analyzes certain customizable criteria. For example, the criteria can include determination of an increase of used disk space that is beyond some percentage, such as 5%. The criteria can include determining whether an increase of used ports is beyond some percentage, such as 10%.

If, using the criteria, it is determined that the target grid compute node needs cleaning (i.e., system data representing the target grid compute node exceed system data specified in the initial snapshot), the process 100 cleans the target grid compute node.

Figure 2:
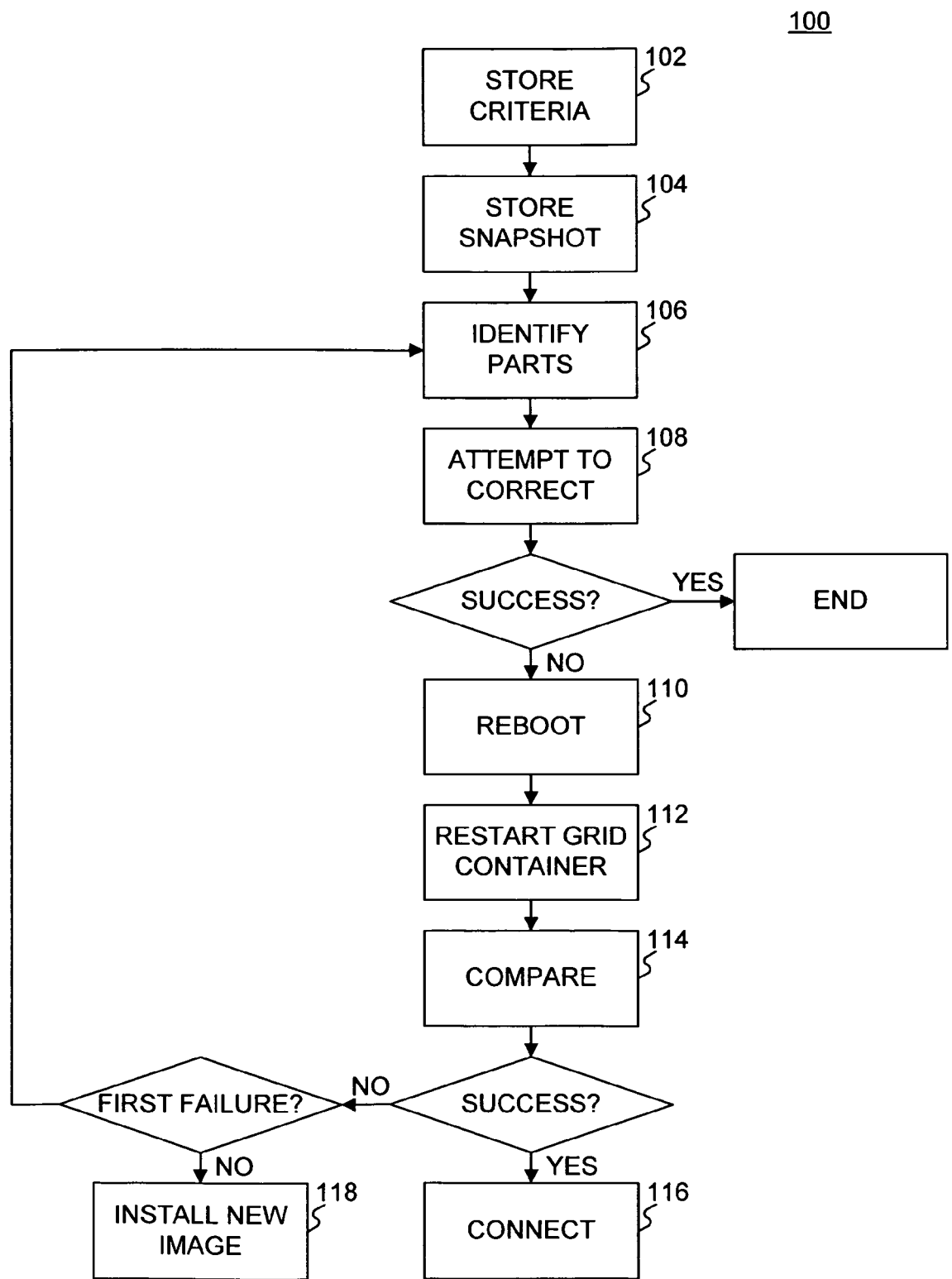
FIG. 2 is a flow diagram.
Like reference symbols in the various drawings indicate like elements.

As shown in FIG. 2, process 100 includes storing (102) cleaning criteria. The cleaning criteria can be stored locally in memory or using some other appropriate storage medium, such as a disk drive. Process 100 stores (104) an initial snapshot of a target grid compute node before deployment of a grid-enabled software application to the target grid compute node.

Process 100 identifies (106) parts of a current snapshot that do not meet the criteria associated with the target grid compute node. For the parts not meeting the criteria, process 100 attempts to correct (108) a current state of the target grid compute node to bring it into compliance with the criteria. For example, if process 100 determines that the target grid compute node contains too many files, process 100 will attempt to delete the files. In another example, if the process 100 determines that main memory usage in the target grid compute node is too high, process 100 can detect running processes that should not run and attempt to stop them. Process 100 can also be used to free used TCP/IP ports.

If process 100 fails to correct (108) the target grid compute node, process 100 initiates a reboot (110) of the target grid compute node. After rebooting, process 100 restarts (112) a grid container on the target grid compute node. In Sun Microsystems' JavaBeans component architecture and in Microsoft's Component Object Model (COM), a container is an application program or subsystem in which the program building block known as a component is run.

If the target grid compute node is running the Windows operating system, the grid container service is started automatically. If the target grid compute node is running the UNIX operating system the grid container service is started via an entry in a UNIX profile file.

After restart, process 100 compares (114) the initial snapshot to the current state. If the criteria are met, the process 100 connects (116) the target grid compute node to the grid network 10. In a particular example, connecting (116) is performed as follows. After reboot, process 100 listens to a certain communication channel (e.g., a TCP/IP port). Prior to initiating the reboot, process 100 residing on grid compute node M1 communicates to grid compute node M2 in the grid network 10 that a restart is taking place, and is passing necessary configuration data (e.g., superior/inferior information). Process 100 residing on grid compute node M2 has the task to poll at certain intervals for grid compute node M1 until it has rebooted. After that, the process 100 residing on grid compute node M2 provides configuration information to process 100 residing on grid compute node M1, which is used to link the grid compute node to the grid network.

In another particular example, a special grid service or application that takes care of attaching rebooted grid compute nodes to the grid network 10 centrally.

If the comparison (114) determines that the criteria are not met, process 100 identifies (106), attempts to correct (108), initiates a reboot (110), restarts (112), compares (114), and connects (116), as described above. If repeating these steps fails, process 100 installs (118) a new disk image on the target grid compute node. In a particular example, a disk image is placed on a bootable local hard disk. In another example, the installation (118) occurs over the grid network 10 with a clean network boot image. In some implementations, the installation (118) uses, for example, a blade management system or a mainframe management system.

To perform the installation (118), the grid application cleaning service 38 includes an application programming interface (API) or other communication mechanism to initiate installing (118) a new image to the target grid compute node. The new image contains a software grid manager (e.g., a software grid manager service residing inside a grid container). At startup of a clean target grid compute node, the grid container is started automatically. The process 100 connects the grid compute node to the grid network 10.

In other embodiments, a single central grid service or application monitors a group or all grid compute nodes. In still other embodiments, the components of the snapshot (e.g., files, ports) are weighted. This is helpful when certain components are more crucial for continuous operation that others.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method for use in a network of interconnected grid compute nodes, comprising:
    storing system criteria for a first grid compute node;
    deploying a grid-enabled application in a memory device of the first grid compute node;
    running the deployed grid-enabled application on a processor of the first grid compute node;
    running a cleaning service on the first grid compute node, wherein the cleaning service takes an initial snapshot of the first grid compute node before the deployed grid-enabled application is run on the first grid compute node, the initial snapshot being separate from the system criteria;
    storing the initial snapshot in the first grid compute node;
    using the cleaning service to stop running of the deployed grid-enabled application;
    preventing acceptance or execution of a first query received from the network of interconnected grid compute nodes;
    taking a current snapshot of the first grid compute node when running of the grid-enabled application is stopped and when acceptance or execution of the first query is being prevented;
    comparing the current snapshot of the first grid compute node with the initial snapshot to identify parts of the current snapshot that do not meet the system criteria; and
    adjusting, using the cleaning service, the first compute node to meet the system criteria.

2. The method of claim 1 wherein the system criteria comprises:
    a listing of all files and directories;
    a total disk space usage;
    a list of Transmission Control Protocol/Internet Protocol (TCP/IP) ports;
    memory usage;
    processor usage; and
    network usage.

3. The method of claim 2 wherein the system criteria are customizable.

4. The method of claim 1 further comprising:
    verifying whether the adjustment is successful;
    communicating to the network of interconnected grid compute nodes that a reboot operation is being initiated with respect to the first grid computer node when the adjustment is unsuccessful;
    rebooting the first grid compute node; and
    starting a grid container in the first compute node after the rebooting.

5. The method of claim 4 further comprising:
    comparing another current snapshot of the first grid compute node with the initial snapshot to identify parts of the another current snapshot that do not meet the system criteria; and
    communicating with the network of interconnected grid compute nodes when the system criteria is met.

6. The method of claim 5 further comprising installing a new disk image on the first grid computer node when the comparison of the initial snapshot with the another current snapshot indicates that the system criteria is not met.

7. The method of claim 6 wherein installing comprises placing the new disk image on a bootable local storage medium of the first grid compute node.

8. The method of claim 6 wherein installing comprises booting the first grid compute new with the new image located on a network device.

9. The method of claim 1 wherein the system criteria are weighted.

10. The method of claim 6 wherein the new image includes the initial snapshot.

11. A computer program product, tangibly embodied in a computer-readable storage medium, the storage medium comprising instructions, which when executed on a data processing apparatus in a network of interconnected computer systems, cause the data processing apparatus to:
    store system criteria for a first grid compute node;
    deploy a grid-enabled application in the first grid compute node;
    run the deployed grid-enabled application on the first grid compute node;
    run a cleaning service on the first grid compute node, wherein the cleaning service takes an initial snapshot of the first grid compute node before the deployed grid-enabled application is run on the first grid compute node, the initial snapshot being separate from the system criteria;
    store the initial snapshot in the first grid compute node;
    use the cleaning service to stop running of the deployed grid-enabled application;
    prevent acceptance or execution of a first guery received from the network of interconnected grid compute nodes;
    take a current snapshot of the first grid compute node when running of the grid-enabled application is stopped and when acceptance or execution of the first query is being prevented;
    compare the current snapshot of the first grid compute node with the initial snapshot to identify parts of the current snapshot that do not meet the system criteria; and
    adjust, using the cleaning service, the first compute node to meet the system criteria.

12. The computer program product of claim 11 wherein the system criteria comprises:
    a listing of all files and directories;
    a total disk space usage;
    a list of TCP/IP ports;
    memory usage;
    processor usage; and
    network usage.

13. The computer program product of claim 12 wherein the system criteria are customizable.

14. The computer program product of claim 11 wherein the instructions further cause the data processing apparatus to:
    verify whether the adjustment is successful;

communicate to the network of interconnected grid compute nodes that a reboot operation is being initiated with respect to the first grid computer node when the adjustment is unsuccessful;

reboot the first grid compute node; and start a grid container in the first compute node after the reboot.

15. The computer program product of claim 14 wherein the instructions further cause the data processing apparatus to:

compare another current snapshot of the first grid compute node with the initial snapshot to identify parts of the another current snapshot that do not meet the system criteria; and communicating with the network of interconnected grid compute nodes when the system criteria is met.

16. The computer program product of claim 15 wherein the instructions further cause the data processing apparatus to install a new disk image on the first grid computer node when the comparison of the initial snapshot with the another current snapshot indicates that the system criteria is not met.

17. The computer program product of claim 16 wherein installing comprises placing the new disk image on a bootable local storage medium of the first grid compute node.

18. The computer program product of claim 16 wherein installing comprises booting the first grid compute new with the new image located on a network device.

19. The computer program product of claim 11 wherein the system criteria are weighted.

20. The computer program product of claim 16 wherein the new image includes the initial snapshot.

21. An apparatus in a network of interconnected grid compute nodes, comprising:

means for storing system criteria for a first grid compute node;

means for deploying a grid-enabled application in the first grid compute node;

means for running the deployed grid-enabled application on the first grid compute node;

means for running a cleaning service on the first grid compute node, wherein the cleaning service takes an initial snapshot of the first grid compute node before the deployed grid-enabled application is run on the first grid compute node, the initial snapshot being separate from the system criteria;

means for storing the initial snapshot in the first grid compute node;

means for using the cleaning service to stop running of the deployed grid-enabled application;

means for preventing acceptance or execution of a first query received from the network of interconnected grid compute nodes;

means for taking a current snapshot of the first grid compute node when running of the grid-enabled application is stopped and when acceptance or execution of the first query is being prevented;

means for comparing the current snapshot of the first grid compute node with the initial snapshot to identify parts of the current snapshot that do not meet the system criteria; and means for adjusting, using the cleaning service, the first compute node to meet the system criteria.

22. The apparatus of claim 21 wherein the system criteria comprises:

a listing of all files and directories;

a total disk space usage;

a list of TCP/IP ports;

memory usage;

processor usage; and network usage.

23. The apparatus of claim 22 wherein the system criteria are customizable.

24. The apparatus of claim 21 further comprising:

means for verifying whether the adjustment is successful;

means for communicating to the network of interconnected grid compute nodes that a reboot operation is being initiated with respect to the first grid computer node when the adjustment is unsuccessful;

means for rebooting the first grid compute node; and means for starting a grid container in the first compute node after the rebooting.

25. The apparatus of claim 24 further comprising:

means for comparing another current snapshot of the first grid compute node with the initial snapshot to identify parts of the another current snapshot that do not meet the system criteria; and means for communicating with the network of interconnected grid compute nodes when the system criteria is met.

26. The apparatus of claim 25 further comprising means for installing a new disk image on the first grid computer node when the comparison of the initial snapshot with the another current snapshot indicates that the system criteria is not met.

27. The apparatus of claim 26 wherein means for installing comprises means for placing the new disk image on a bootable local storage medium of the first grid compute node.

28. The apparatus of claim 26 wherein means for installing comprises booting the first grid compute new with the new image located on a network device.

29. The apparatus of claim 21 wherein the system criteria are weighted.

30. The apparatus of claim 26 wherein the new image includes the initial snapshot.

\* \* \* \* \*

UNITED STATES PATENT AND TRADEMARK OFFICE
CERTIFICATE OF CORRECTION

PATENT NO. : 7,587,480 B2  Page 1 of 1
APPLICATION NO. : 11/017401
DATED : September 8, 2009
INVENTOR(S) : Gebhart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Twenty-first Day of September, 2010

David J. Kappos
*Director of the United States Patent and Trademark Office*